(12) United States Patent
Ekambaram et al.

(10) Patent No.: US 9,948,729 B1
(45) Date of Patent: Apr. 17, 2018

(54) BROWSING SESSION TRANSFER USING QR CODES

(71) Applicant: International Business Machines Corporation, Armonk, NY (US)

(72) Inventors: Vijay Ekambaram, Tamilnadu (IN); Ashok Pon Kumar Sree Prakash, Bangalore (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/294,701

(22) Filed: Oct. 15, 2016

(51) Int. Cl.
*G06K 19/06* (2006.01)
*G06F 3/14* (2006.01)
*H04L 29/08* (2006.01)
*H04W 4/00* (2018.01)
*G06F 3/01* (2006.01)
(Continued)

(52) U.S. Cl.
CPC ............ *H04L 67/148* (2013.01); *G06F 3/013* (2013.01); *G06F 3/1454* (2013.01); *G06K 7/1417* (2013.01); *G06K 19/06037* (2013.01); *G06K 19/06112* (2013.01); *G09G 5/14* (2013.01); *H04L 67/02* (2013.01); *H04W 4/008* (2013.01)

(58) Field of Classification Search
None
See application file for complete search history.

(56) References Cited

U.S. PATENT DOCUMENTS

| 444,795 A | 1/1891 | King |
|---|---|---|
| 5,619,378 A | 4/1997 | Schwab |

(Continued)

FOREIGN PATENT DOCUMENTS

| JP | 2000353248 A | 12/2000 |
|---|---|---|
| JP | 2002368762 A | 12/2002 |

(Continued)

OTHER PUBLICATIONS

Pandya et al. "A Survey on QR Codes: in context of Research and Application", International Journal of Emerging Technology and Advanced Engineering, Website: www.ijetae.com, ISSN 2250-2459, ISO 9001:2008 Certified Journal, vol. 4, Issue 3, Mar. 2014.*

(Continued)

*Primary Examiner* — Yingchun He
(74) *Attorney, Agent, or Firm* — Law Offices of Ira D. Blecker, P.C.

(57) ABSTRACT

A method for browsing session transfer which includes: communicating by a head mounted device (HMD) with a first browser, the first browser displaying a browser session; responsive to the first browser creating a first session QR code, capturing by the HMD the first session QR code; communicating by the HMD with a second browser; responsive to the second browser creating a second session QR code, capturing by the HMD the second session QR code; merging by the HMD the first session QR code with the second session QR code into a merged QR code; transmitting by the HMD the merged QR code to the second browser; and responsive to the second browser loading the merged QR code, the second browser displaying the browser session from the first browser. Also included is a system and computer program product.

20 Claims, 7 Drawing Sheets

(51) Int. Cl.
*G09G 5/14* (2006.01)
*G06K 7/14* (2006.01)

(56) References Cited

U.S. PATENT DOCUMENTS

| | | | |
|---|---|---|---|
| 5,689,619 | A | 11/1997 | Smyth |
| 7,401,920 | B1 | 7/2008 | Kranz et al. |
| 7,522,344 | B1 | 4/2009 | Curatu et al. |
| 7,542,210 | B2 | 6/2009 | Chirieleison, Sr. |
| 8,096,660 | B2 | 1/2012 | Vertegaal et al. |
| 8,190,749 | B1 | 5/2012 | Chi et al. |
| 8,472,120 | B2 | 6/2013 | Border et al. |
| 8,482,859 | B2 | 7/2013 | Border et al. |
| 8,488,246 | B2 | 7/2013 | Border et al. |
| 8,510,166 | B2 | 8/2013 | Neven |
| 8,640,957 | B2 | 2/2014 | Yang et al. |
| 8,775,850 | B2 | 7/2014 | Moy |
| 8,812,601 | B2 | 8/2014 | Hsieh et al. |
| 8,819,798 | B2 | 8/2014 | Zises |
| 2011/0228975 | A1 | 9/2011 | Hennessey et al. |
| 2012/0212484 | A1 | 8/2012 | Haddick et al. |
| 2012/0235900 | A1 | 9/2012 | Border et al. |
| 2012/0274750 | A1 | 11/2012 | Strong |
| 2013/0080525 | A1 | 3/2013 | Aoki et al. |
| 2013/0293468 | A1 | 11/2013 | Perez et al. |
| 2014/0173125 | A1 | 6/2014 | Selvanandan |
| 2015/0002394 | A1 | 1/2015 | Cho et al. |
| 2015/0181632 | A1 | 6/2015 | Ur et al. |
| 2015/0288666 | A1 | 10/2015 | Rao et al. |

FOREIGN PATENT DOCUMENTS

| | | |
|---|---|---|
| JP | 3413127 B2 | 6/2003 |
| JP | 2013020422 A | 1/2013 |
| WO | 2011139963 A2 | 11/2011 |

OTHER PUBLICATIONS

Appendix P citing related patent applications U.S. Appl. No. 14/821,161 and U.S. Appl. No. 14/283,990.

Zhefan Ye et al., "Detecting Eye Contact using Wearable Eye-Tracking Glasses", UbiComp '12, Sep. 5-8, 2012, Pittsburgh, PA, all pages.

"Sharing your Pictures and Videos", [online], [retrieved from the internet on Feb. 24, 2015], <URL: https://support.google.com/glass/answer/3079691?hl=en>, all pages.

Jamie Carter, "You can control Haier's Eye TV using just your eyes", [online], [retrieved from the Internet on Feb. 24, 2015], <URL: http://www.techradar.com/news/television/you-can-control-haier-s-eye-tv-using-just-your-eyes-1094526>, all pages.

John M. Franchak et al., "Head-mounted eye-tracking of infants' natural interactions: a new method", Proceedings of the 2010 Symposium on Eye-Tracking Research & Applications, pp. 21-27, 2010, all pages.

Hong Hua et al., "Video-Based Eyetracking Methods and Algorithms in Head-Mounted Displays", Optics Express, vol. 14, Issue 10, 2006, pp. 4328-4350, all pages.

Sri Satchmo, "Arjuna bird's eye". [online]. Nov. 26, 2011. [retrieved on Jan. 24, 2014]. Retrieved from the Internet. <URL: http://srisatchmo.wordpress.com/tag/arjuna-birds-eye/>, all pages.

Hyun Soo Park et al., "3D Social Saliency from Head-mounted camera", Advances in Neural Information Processing Systems (NIPS), Dec. 2012, 25, pp. 431-439.

"Google Glass: release date, news and features". [online], Nov. 7, 2013. [retrieved on Jan. 24, 2014]. Retrieved from the Internet <URL: http://www.techradarcom/news/video/google-glass-what-you-need-to-know-1078114>, all pages.

"Mutualink Unveils Google Glass for Public Safety". [online]. Aug. 19, 2013. [retrieved on Jan. 24, 2014]. Retrieved from the Internet <URL: http://www.businesswire.com/news/home/20130819005155/en/Mutualink-Unveils-Google-Glass-Public-Safety>, all pages.

"What are the advantages of having two eyes?". [online]. [retrieved on Feb. 3, 2014]. Retrieved from the Internet <URL: http://wiki.answers.com/Q/What_are_the_advantages_of_having_two_eyes>, all pages.

"Calculate distance, bearing and more between Latitude/Longitude points". [online] [retrieved on May 15, 2014]. Retrieved from the Internet <URL: http://www.movable-type.co.uk/scripts/latlong.html>, all pages.

"EasyMeasure—Measure with your Camera". [online] [retrieved on May 15, 2014]. Retrieved from the Internet <URL: https://itunes.apple.com/us/app/easymeasure-measure-your-camera?/id349530105?mt=8>, all pages.

"Smart Measure". [online] [retrieved on May 15, 2014]. Retrieved from the Internet <URL:https://play.google.com/store/apps/details?id=kr.sira.measure>, all pages.

"Eyes Don't Lie: A New Way to Use Gaze Tracking in the Classroom", [online], [Retrieved on Apr. 25, 2016], Retrieved from the Internet: <https://www.edsurge.com/news/2015-04-27-eyes-don-t-lie-a-new-way-to-use-gaze-tracking-in-the-classroom>.

Niall Firth, "Eye-tracker lets you drag and drop files with a glance", [online], Dec. 11, 2013, Retrieved from the Internet: <https://www.newscientist.com/article/dn24742-eye-tracker-lets-you-drag-and-drop-files-with-a-glance/>.

Jayson Turner et al., "Cross-Device Gaze-Supported Point-to-Point Content Transfer", Proceeding ETRA '14 Proceedings of the Symposium on Eye Tracking Research and Applications, Mar. 26-28, 2014.

"Haier Eye-Controlled TV : Engadget at IFA 2013", [online], Retrived from the Internet: <https://www.youtube.com/watch?v=TnrT7RmDkpw>, Sep. 6, 2013.

\* cited by examiner

BROWSING SESSION TRANSFER USING QR CODES

BACKGROUND

The present exemplary embodiments pertain to techniques for transferring a state of a browser application between devices and, more particularly, pertain to a method, system and computer program product for transferring a state of an application between devices in response to gestural input.

People are utilizing electronic devices for an increasing number and variety of tasks. It is not uncommon for a user to possess or have access to multiple electronic devices. Within a single day, a user may switch between multiple electronic devices: from checking the weather on a personal computer at home, looking at a mobile device on the way to the car, using the work desktop as the user arrives the office, switching back to the mobile device when the user steps out of work or is on the way home, and then getting back onto the home desktop or laptop after the user returns home. Even while a user is within his home, the user may opt to switch from his home desktop from when he is in his bedroom to the big television screen while sitting in his living room or to his portable laptop at the dining table.

Oftentimes, when the user is moving between locations and switching between devices, the user may be three-quarters through reading a news article, in the middle of playing a video game, halfway through watching a YouTube® video, or partially through listening to a song. The user may find it inconvenient to switch between the different devices because the user may either need to relocate the information or start from the beginning again when switching between devices. There is currently no easy way for a user to switch between multiple devices easily without disrupting the user's interaction with the devices. As people continue to encounter an increasing number of electronic devices, a need exists to improve the overall user experience for users when switching between devices.

BRIEF SUMMARY

The various advantages and purposes of the exemplary embodiments as described above and hereafter are achieved by providing, according to an aspect of the exemplary embodiments, a computer-implemented method for browsing session transfer comprising: communicating by a head mounted device (HMD) with a first browser, the first browser displaying a browser session; responsive to the first browser creating a first session QR code, capturing by the HMD the first session QR code; communicating by the HMD with a second browser; responsive to the second browser creating a second session QR code, capturing by the HMD the second session QR code; merging by the HMD the first session QR code with the second session QR code into a merged QR code; transmitting by the HMD the merged QR code to the second browser; and responsive to the second browser loading the merged QR code, the second browser displaying the browser session from the first browser.

According to another aspect of the exemplary embodiments, there is provided a system for browsing session transfer comprising: a head mounted device; a non-transitory storage medium that stores instructions; and a processor that executes the instructions to perform the following functions: communicate by the head mounted device (HMD) with a first browser, the first browser displays a browser session; capture by the HMD a first session QR code received from the first browser; communicate by the HMD with a second browser; responsive to the second browser creating a second session QR code, capture by the HMD a second session QR code received from the second browser; merge by the HMD the first session QR code with the second session QR code into a merged QR code; and transmit by the HMD the merged QR code to the second browser for display by the second browser the browser session from the first browser.

According to a further aspect of the exemplary embodiments, there is provided a computer program product for browsing session transfer, the computer program product comprising a computer readable storage medium having program instructions embodied therewith, the program instructions executable by a processor to cause the processor to perform a method comprising: communicating with a first browser, the first browser displaying a browser session; responsive to the first browser creating a first session QR code, capturing the first session QR code; communicating with a second browser; responsive to the second browser creating a second session QR code, capturing the second session QR code; merging the first session QR code with the second session QR into a merged QR code; and transmitting the merged QR code to the second browser so that the second browser displays the browser session from the first browser.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

Figure 1:
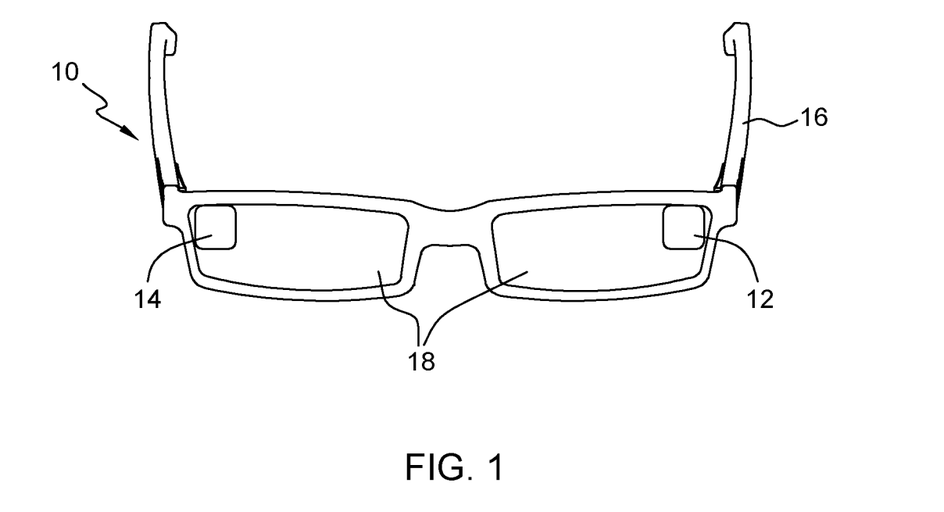
FIG. 1 is an illustration of a head mounted device that may be used in the exemplary embodiments.

Referring now to FIG. 1, there is shown an illustration of a head mounted device 10 that may be used in the exemplary embodiments. It should be understood that head mounted device 10 shown in FIG. 1 is only meant for purposes of illustration and not limitation and that other head mounted devices may serve the purposes of the exemplary embodiments provided these other head mounted devices have the functions and capabilities described herein.

Head mounted device 10 may include a video display 12 for the left eye and a video display 14 for the right eye. Included within the frame 16 of the head mounted device 10 may be one or more computing devices (not shown in FIG. 1). Head mounted device 10 may or may not have lenses 18 which may or may not be prescription lenses.

The head mounted device may be any head mounted device such as Google Glass (Google), Looxcie (Looxcie Inc.), iOptik (Innovega Inc.) or Goldeni (Kopin), just to name a few.

Figure 2:
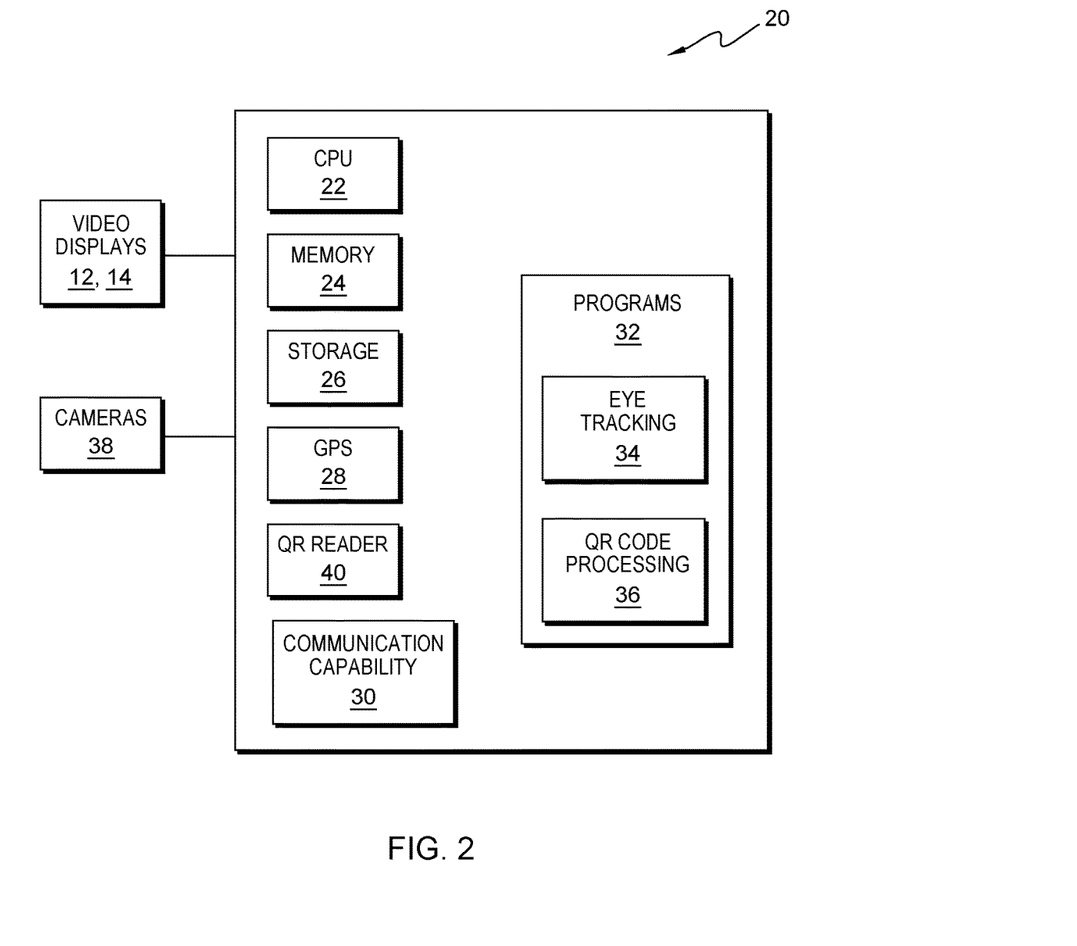
FIG. 2 is an illustration of a block diagram of a computing device that may be present in the head mounted device of FIG. 1.

Referring now to FIG. 2, there is shown a block diagram of a computer device 20 that may be present in head mounted device 10. Computing device 20 may include a central processing unit (CPU) 22, memory 24 and storage 26, such as solid state storage. While storage 26 is shown as within computing device 20, storage 26 may alternatively be cloud storage (i.e., storage on a remote server which may be connected to the head mounted device 10 by a network such as the internet via cellular or Wi-Fi capability in the head mounted device 10.). In addition, the computing device 20 may have a Global Positioning System (GPS) 28. The head mounted device 10 has communication capability, indicated by box 30, to communicate with other head mounted devices as well as other computing devices such as smart phones, laptops, work stations and the like. The communication capability may include, but not be limited to, Wi-Fi, cellular, short range radio such as Bluetooth® and Near Field Communication, and even satellite capability.

The computing device 20 may, in addition, have certain applications or programs 32 resident in the computing device 30. These applications or programs 32 may include eye tracking 34 of the user of the head mounted device 10 and Quick Response (QR) code processing 36. It should be understood that it is within the scope of the exemplary embodiments for these applications or programs 32 to be accessible remotely by the internet or in cloud storage.

The computing device 20 may be connected to video screens 12, 14 shown in FIG. 1. In addition, the computing device 20 may be connected to one or more cameras 38 (not shown in FIG. 1) that may be present in the head mounted device 10. The cameras 38 may be facing toward the user of the head mounted device 10 to catch eye movements (described hereafter) or facing away from the user of the head mounted device or both.

Eye tracking is a well-known technique for determining the point at which a user may be focusing on. One method of eye tracking is where cameras 38 in the head mounted device 10 may register eye movements of the user of the head mounted device 10 as the user focuses on a target object. These eye movements may be converted to a user's gaze by eye tracking application 34.

In general, a QR code is a unique two-dimensional code that is readable by a computer device. For this purpose, computing device 20 has a QR reader 40. The QR reader 40 may use cameras 38 for QR reading or QR reader 40 may be separate from cameras 38. A QR code typically includes black modules arranged in a square pattern on a white background and may be created by any commercially available application which generates QR codes from data sets. The QR code may be defined according to an ISO standard. In one exemplary embodiment, the QR code processing program in computing device 20 may take a QR code read by QR reader 40 and modify the QR code according to one or more exemplary embodiments as will be described below.

Figure 3:
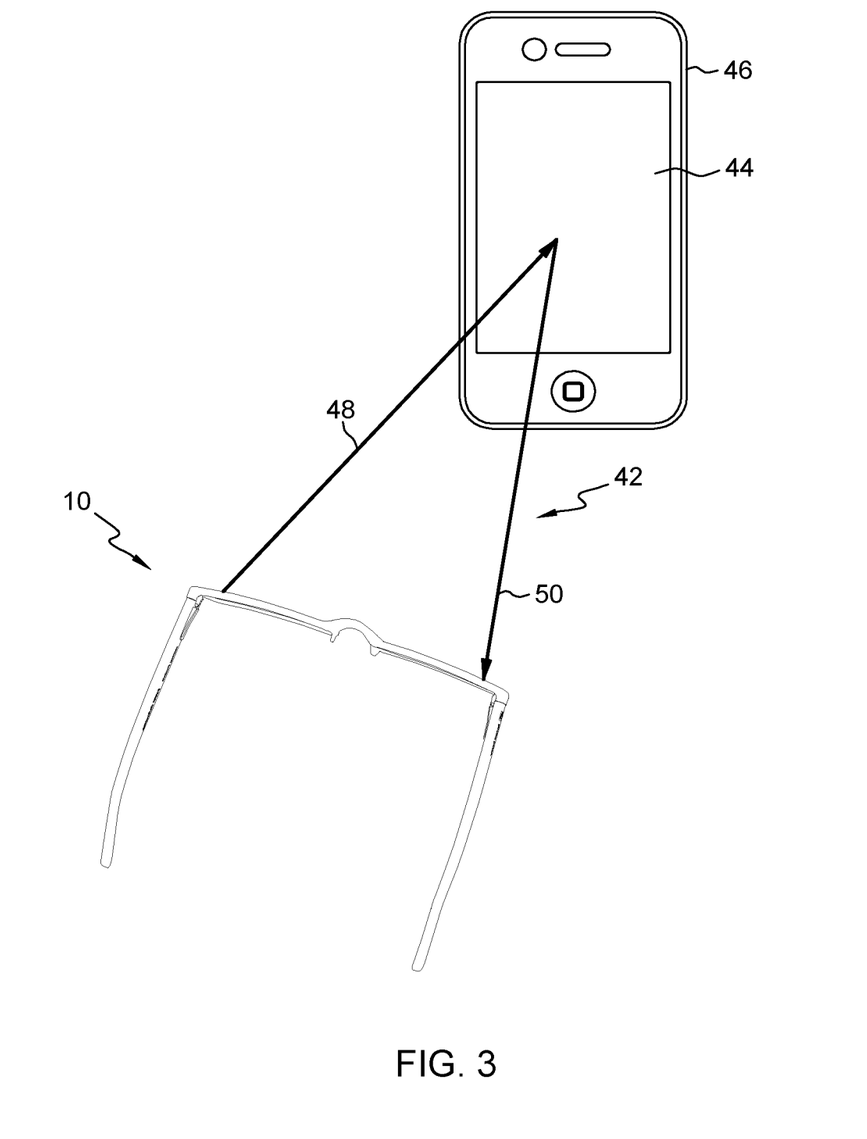
FIG. 3 is an illustration of the head mounted device 10 initiating a line of sight communication with a browser of another device.

Referring now to FIG. 3, head mounted device 10 initiates a line of sight communication 42 with a browser 44 of another device 46. The device 46 shown in FIG. 3 is a smart phone but could be any other device having a browser.

In one exemplary embodiment, eye tracking program 34 in computing device 20 may detect a line of sight directed from the head mounted device 10 to browser 44 in smart phone 46. The head mounted device 10 may send a handshake request 48 to browser 44 in smart phone 46. The head mounted device 10 may receive a handshake acknowledgement 50 from browser 44 in smart phone 46. The handshake request 48 and handshake acknowledgement 50 may be effective to create the handshake. Thereafter, the head mounted device 10 and browser 44 in smart phone 46 may thereafter share data. In addition, the head mounted device's public key may be shared with browser 44 in smart phone 46.

Figure 4:
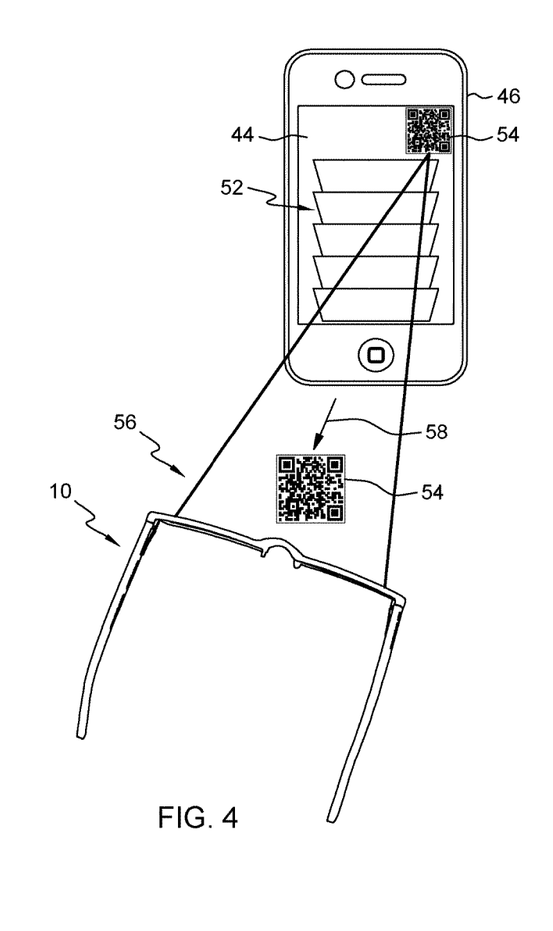
FIG. 4 is an illustration of the browser of FIG. 3 shown in more detail as having five tabs or windows opened in the browser.

Referring now to FIG. 4, browser 44 is shown in more detail as having five tabs or windows 52 opened in the browser 44. Each tab 52 may represent a different URL (Uniform Resource Locator) that is opened in the browser 44. The combination of all opened tabs 52 in the browser 44 along with the sessions in the various tabs represents the state of the browser 44.

The browser 44 captures all of the session data associated with each browser tab 52 in the state of the browser 44 and on-the-fly creates a session QR code 54 which is displayed in the browser 44. The session QR code 54 contains all of the browser session information in encoded form. The session QR code 54 may be encrypted with the user's public key previously shared with the browser 44. By encrypting the session QR code 54 with the user's public key, illegitimate users may not be able to scan and decode the session QR code 54.

Whenever the user wants, or has the need, to switch devices, the user may gaze, indicated by 56, at the session QR code 54 through head mounted device 10 and then do an eye-gesture, for example a "wink". The gaze event 56 and eye gesture are captured by the head mounted device 10 which enables one or more cameras 38 in the head mounted device 10 to scan the displayed session QR-code 54. The head mounted device 10 captures, indicated by arrow 58, and stores in memory 24 or storage 26 the session QR code 54 which has all the session data associated with browser 44.

The exemplary embodiments where the session QR code 54 is absorbed by the head mounted device 10 has the following advantages:

- The user's head mounted device 10 has finer control to get session information of any browser the user is viewing based on their line of sight when there are many open browsers in the viewed device.
- This greatly improves the end user experience as the user does the most intuitive step.
- The exemplary embodiments do not depend on any operating system security controls to relay control information to the right application under multiple application scenarios.

The exemplary embodiments provide a better user trust factor since (1) the session QR code 54 is encrypted using the public key of the user, and (2) the user cognitively knows the right browser to which the user is going to transfer the session state as the user has to gaze at the target browser which prevents unintended mistakes (such as sending wrong or other applications session data, etc.).

Figure 5:
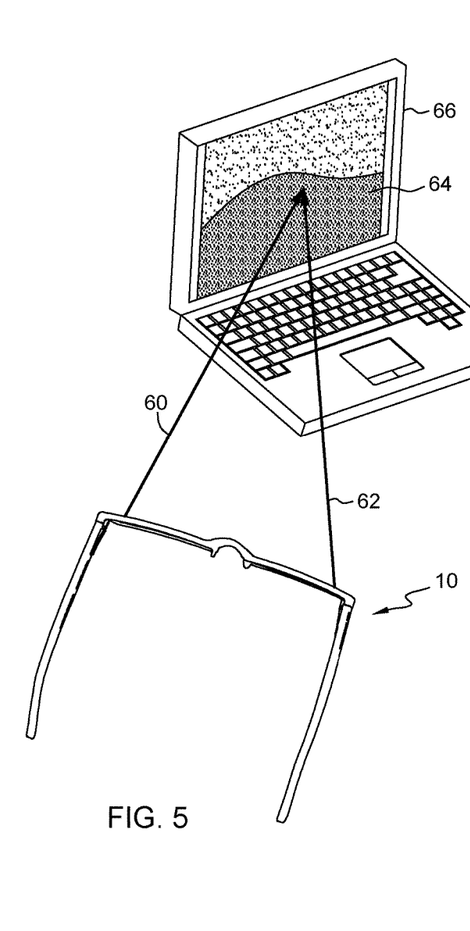
FIG. 5 is an illustration of the head mounted device establishing a line of sight communication with a browser in another device.

Referring now to FIG. 5, the user through head mounted device 10 may establish a line of sight communication with a browser in another device, in this case browser 64 in laptop 66. As before, a handshake request 60 may be sent to browser 64 of laptop 66 and a handshake acknowledgement 62 may be sent from browser 64 of laptop 66. In addition, device information such as a photo of the device or device identification and the public key of the browser 64 of the laptop 66 may be transferred to the user through the head mounted device 10. The purpose for receiving the public key of the browser 64 is to encrypt the information that needs to be sent to browser 64 with the public key, which can then be read only by browser 64. The device information may be shown to the user through the head mounted device 10 and the user may confirm that the user desires to share session information with browser 64 of laptop 66.

It should be understood that the exemplary embodiments are applicable to transferring state between different devices. In this scenario, handshaking is required to establish communication with the second device as described above.

The exemplary embodiments are also applicable to transferring state between different browsers (example Firefox and Chrome) in the same device. In this scenario, it is preferred that handshaking would also be required.

Figure 6:
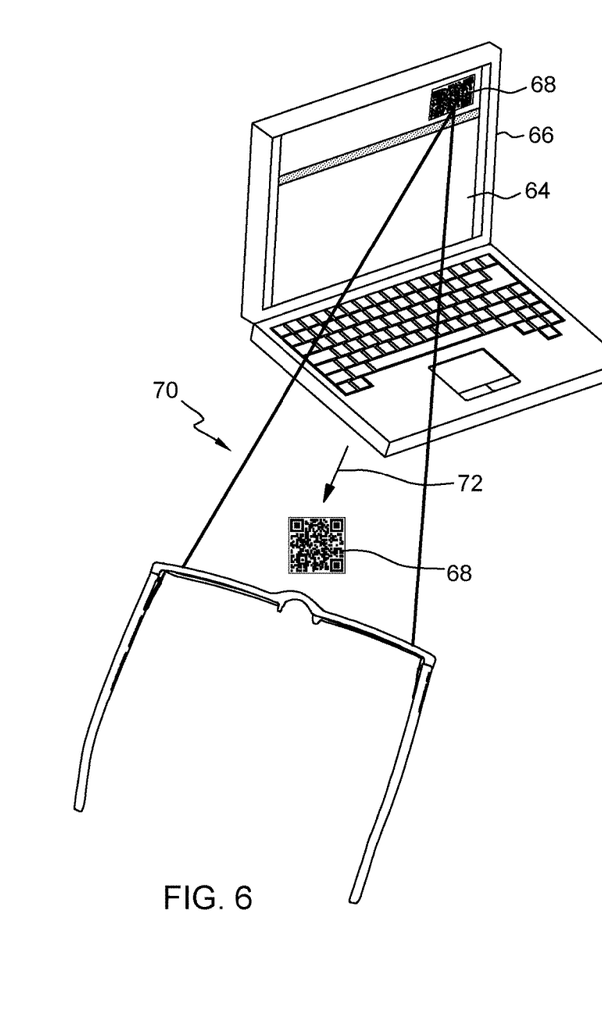
FIG. 6 is an illustration of a user gazing through head mounted device at a current session QR code of the browser of FIG. 5.

The browser 64 is shown in more detail in FIG. 6. Whenever the user through head mounted device 10 focuses on a new browser in the same device or a browser in a new device and the user wants to continue with the same state of the previous browser (such as browser 44 in smart phone 46), the user gazes 70 through head mounted device 10 at the current session QR code 68 of the browser 64. The head mounted device 10 captures, indicated by arrow 72, the current session QR code 68 of the new browse 64 and stores the current session QR code 68 in memory 24 or storage 26.

After the head mounted device 10 captures the current session QR code 68, the current session QR code 68 and the previous session QR code 54 are merged into a new session QR code 74. This process is graphically illustrated in FIG. 7. The state of the browser session in browser 44 as embodied in session QR code 54 (graphically illustrated as session $QR_1$) is merged with the state of the browser session in browser 64 as embodied in session QR code 68 (graphically illustrated as session $QR_2$) to result in the merged session QR code 74 (graphically illustrated as session $QR_{merge}$). Essentially, the state of the browser 44 along with the state of browser 64 is encoded in the merged QR code 74. The merged session QR code 74 may be encrypted with the public key of the browser 64. Since the merged QR code 74 is going to be sent to the browser 64, the browser session information of the state of the browser 44 has been encrypted with the public key of browser 64, which can only be decrypted by the browser 64, since only browser 64 has its private key.

Figure 8:
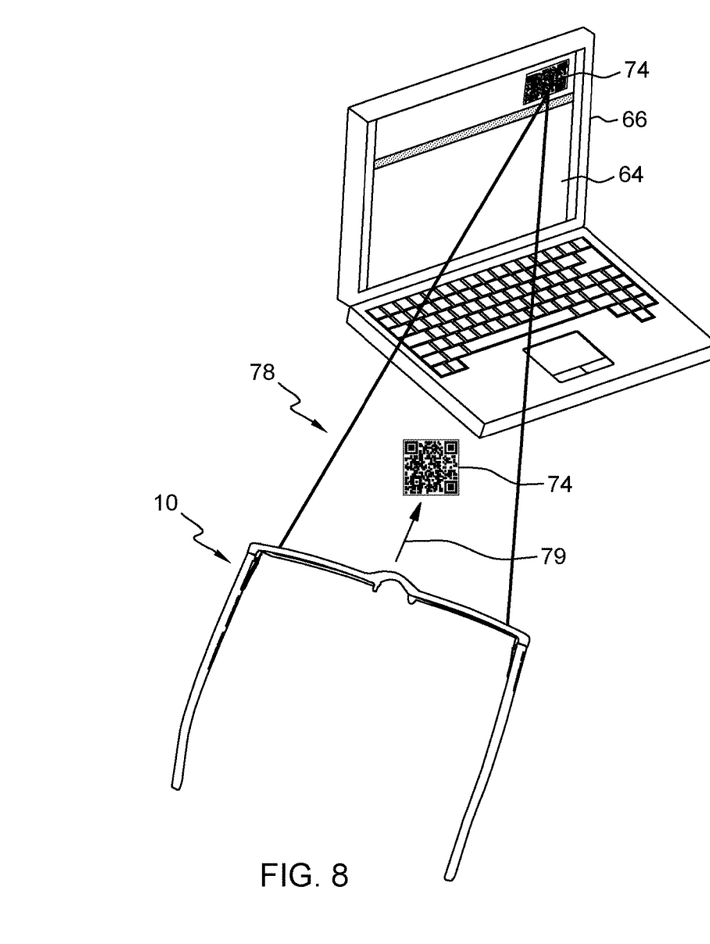
FIG. 8 is an illustration of the user gazing through the head mounted device towards the browser of Figures and 6 and transmitting the merged session QR code to the browser of FIGS. 5 and 6.

Referring now to FIG. 8, the user may gaze 78 through head mounted device 10 towards browser 64 and transmit, indicated by arrow 79, the merged session QR code 74 to browser 64. The merged session QR code 74 may then replace the previous session QR code 68. Before the browser 64 is actually updated with the new session state as embodied in merged session QR code 74, the user through head mounted device 10 may receive a pop up message requesting the user to confirm that the user wishes to update the session state of browser 64 with the new session state as embodied in merged session QR code 74. If the user confirms that the session state of browser 64 is to be updated, then the browser 64 is updated according to the session data in merged session QR code 74.

Figure 9:
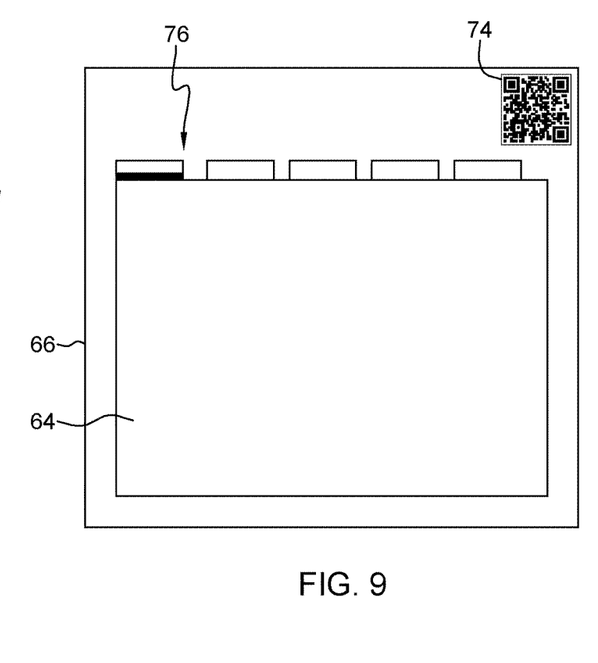
FIG. 9 is an illustration of the browser of FIG. 8 showing the tabs of browser session of FIG. 4.

Browser 64 updates the displayed session QR code with the merged session QR code 74 retrieved from the head mounted device 10. Since the currently viewed browser 64 now has the session information of the user's last focused browser, which is browser 44 in smart phone 46, browser 64 loads all the user viewed tabs from browser 44 with the session state maintained in the new browser 64. FIG. 9 is an enlarged view of browser 64 showing tabs 76 which correspond to tabs 52 in browser 44. Tabs 76 are directed to the same URLs and in the same order as tabs 52 in browser 44. Thus, the state of browser 44 has been effectively transferred to browser 64.

Figure 10:
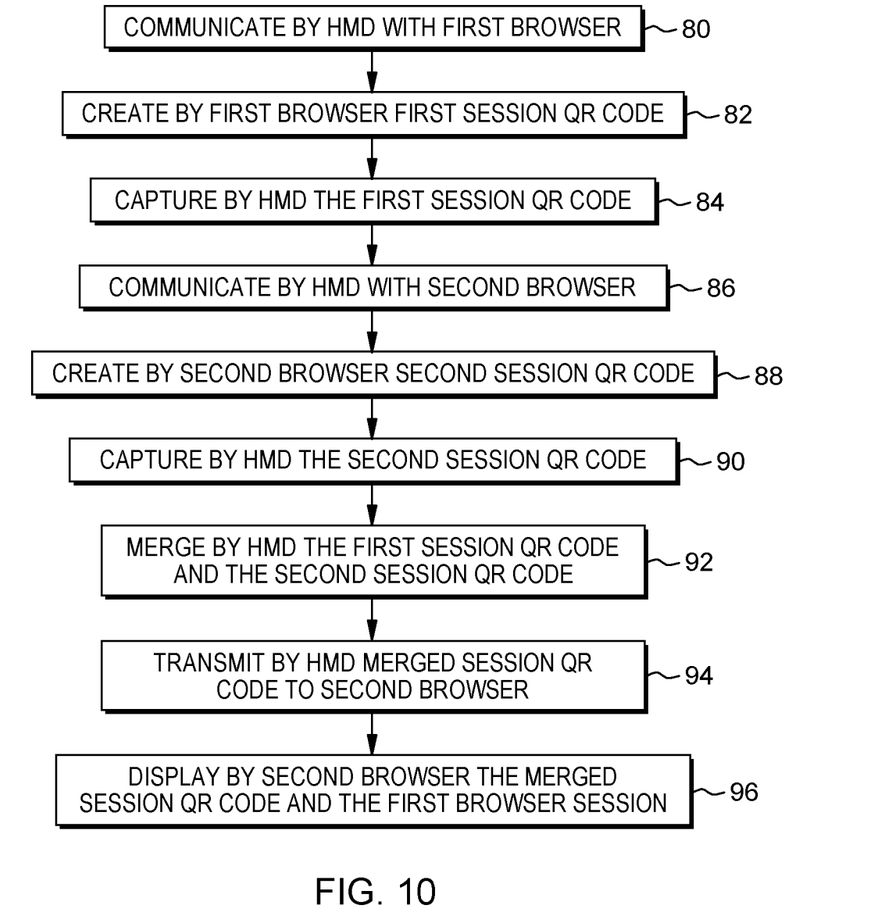
FIG. 10 is a flow chart illustrating the process of the exemplary embodiments.

FIG. 10 is a flow chart illustrating the exemplary embodiments. In a first step, the head mounted device 10 may communicate with a first browser, such as browser 44 in FIG. 3, box 80.

The first browser may create a first session QR code, such as session QR code 54 in FIG. 4, box 82.

The head mounted device 10 may capture the first session QR code, box 84.

The head mounted device 10 may communicate with a second browser, such as browser 64 in FIG. 5, box 86.

The second browser may create a second session QR code, such as session QR code 68 in FIG. 6, box 88.

The head mounted device 10 may capture the second session QR code, box 90.

Figure 7:
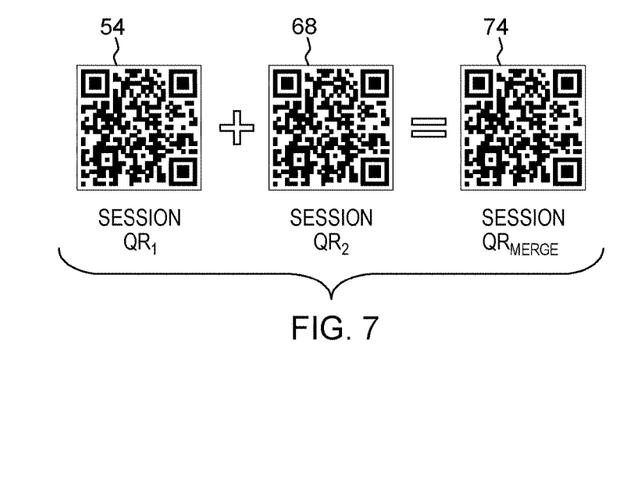
FIG. 7 is a graphical illustration of merging session QR codes.

The head mounted device 10 may merge the first session QR code and the second session QR code into a merged session QR code, such as merged session QR code 74 in FIGS. 7 to 9, box 92.

The head mounted device 10 may transmit the merged session QR code to the second browser, box 94.

The second browser loads the merged session QR code and displays the merged session QR code and the browser session from the first browser, box 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A computer-implemented method for browsing session transfer comprising:
   communicating by a head mounted device (HMD) with a first browser, the first browser displaying a browser session;
   responsive to the first browser creating a first session Quick Response (QR) code, capturing by the HMD the first session QR code;
   communicating by the HMD with a second browser;
   responsive to the second browser creating a second session QR code, capturing by the HMD the second session QR code;
   merging by the HMD the first session QR code with the second session QR code into a merged QR code;
   transmitting by the HMD the merged QR code to the second browser; and
   responsive to the second browser loading the merged QR code, the second browser displaying the browser session from the first browser.

2. The method of claim 1 wherein the browser session contains at least one URL tab.

3. The method of claim 1 wherein the first browser and the second browser are on different devices.

4. The method of claim 1 wherein the first browser and the second browser are on the same device.

5. The method of claim 1 wherein the first session QR code contains browser session data of the first browser and each browser tab opened in the first browser and the second session QR code contains browser session data of the second browser and each browser tab opened in the second browser.

6. The method of claim 5 wherein the merged QR code contains the browser session data of the first browser and the each browser tab opened in the first browser.

7. The method of claim 1 wherein communicating by the HMD with the first browser further includes transmitting a public key of the HMD to the first browser wherein the first session QR code is encrypted by the public key.

8. The method of claim 1 wherein communicating by the HMD with a second browser includes receiving a public key of the second browser and wherein merging by the HMD the first session QR code with the second session QR code includes encrypting the merged QR code with the public key of the second browser.

9. A system for browsing session transfer comprising:
a head mounted device (HMD);
a non-transitory storage medium that stores instructions; and
a processor that executes the instructions to perform the following functions:
communicate by the HMD with a first browser, the first browser displays a browser session;
capture by the HMD a first session Quick Response (QR) code received from the first browser; communicate by the HMD with a second browser;
responsive to the second browser creating a second session QR code, capture by the HMD a second session QR code received from the second browser;
merge by the HMD the first session QR code with the second session QR code into a merged QR code; and
transmit by the HMD the merged QR code to the second browser for display by the second browser the browser session from the first browser.

10. The system of claim 9 wherein the browser session contains at least one URL tab.

11. The system of claim 9 wherein the first session QR code contains browser session data of the first browser and each browser tab opened in the first browser and the second session QR code contains browser session data of the second browser and each browser tab opened in the second browser.

12. The system of claim 11 wherein the merged QR code contains the browser session data of the first browser and the each browser tab opened in the first browser.

13. The system of claim 9 wherein communicate by the HMD with the first browser further includes transmit a public key to the first browser wherein the first session QR code is encrypted by the public key.

14. The system of claim 9 wherein communicate by the HMD with a second browser includes receive a public key of the second browser and wherein merge by the HMD the first session QR code with the second session QR code includes encrypt the merged QR code with the public key of the second browser.

15. A computer program product for browsing session transfer, the computer program product comprising a computer readable storage medium having program instructions embodied therewith, the program instructions executable by a processor to cause the processor to perform a method comprising:
communicating by a head mounted device (HMD) with a first browser, the first browser displaying a browser session;
responsive to the first browser creating a first session Quick Response (QR) code, capturing the first session QR code;
communicating by the HMD with a second browser;
responsive to the second browser creating a second session QR code, capturing the second session QR code;
merging the first session QR code with the second session QR code into a merged QR code; and
transmitting the merged QR code to the second browser so that the second browser displays the browser session from the first browser.

16. The computer program product of claim 15 wherein the browser session contains at least one URL tab.

17. The computer program product of claim 15 wherein the first session QR code contains browser session data of the first browser and each browser tab opened in the first browser and the second session QR code contains browser session data of the second browser and each browser tab opened in the second browser.

18. The computer program product of claim 17 wherein the merged QR code contains the browser session data of the first browser and the each browser tab opened in the first browser.

19. The computer program product of claim 15 wherein communicating by the HMD with the first browser further includes transmitting a public key to the first browser wherein the first session QR code is encrypted by the public key.

20. The computer program product of claim 15 wherein communicating by the HMD with a second browser includes receiving a public key of the second browser and wherein merging by the HMD the first session QR code with the second session QR code includes encrypting the merged QR code with the public key of the second browser.

* * * * *